United States Patent [19]

Vogelsanger

[11] 3,907,625
[45] Sept. 23, 1975

[54] MEANS FOR WELDING PLASTIC PIPE JOINTS TO PLASTIC PIPES

[75] Inventor: Kurt Vogelsanger, Schaffhausen, Switzerland

[73] Assignee: Georg Fischer Aktiengesellschaft, Switzerland

[22] Filed: Dec. 4, 1972

[21] Appl. No.: 311,551

[30] Foreign Application Priority Data
Dec. 3, 1971  Switzerland................. 17578/71

[52] U.S. Cl. ............. 156/253; 156/306; 156/322; 156/583; 285/197; 285/DIG. 20
[51] Int. Cl.² .................. B29C 27/02; B29D 9/00
[58] Field of Search .......... 156/158, 159, 253, 580, 156/583, 293, 272, 304, 306, 503, 322, 257, 499, 273, 275, 298; 264/206, 230, 349, 235, 248, 346; 138/155; 285/DIG. 20, 21, 197, 40, 155, 156; 29/98, 86

[56] References Cited
UNITED STATES PATENTS

| | | | |
|---|---|---|---|
| 2,184,534 | 12/1939 | Smith et al............................ | 285/21 |
| 3,022,209 | 2/1962 | Campbell............................. | 156/158 |
| 3,200,182 | 8/1965 | Hechelhammer et al............ | 264/346 |
| 3,317,642 | 5/1967 | Bailey................................. | 264/235 |
| 3,412,233 | 11/1968 | Wilkie................................. | 156/583 |
| 3,506,519 | 4/1970 | Blumenkranz....................... | 156/293 |
| 3,634,167 | 1/1972 | Plontke............................... | 156/580 |
| 3,654,008 | 4/1972 | Rogers et al....................... | 156/293 |
| 3,656,233 | 4/1972 | Overholser......................... | 264/346 |
| 3,668,288 | 6/1972 | Takahashi.......................... | 264/209 |

*Primary Examiner*—Charles E. Van Horn
*Assistant Examiner*—Michael W. Boll
*Attorney, Agent, or Firm*—Toren, McGeady and Stanger

[57] ABSTRACT

A plastic pipe joint, integrally composed of a saddle-shaped foot plate and a pipe stub, is welded to the outer surface of a pipe by melting the concave surface of the foot plate and the entire periphery of the pipe along a cylindrical zone whose axial length is somewhat larger than the foot plate. The pipe joint is seated on the pipe surface by means of its foot plate and the plastic allowed to cool until the adjacent melted parts fuse and form a welding joint. Melting of the entire periphery of the pipe within the axial zone avoids later stresses at the welding joint.

11 Claims, 11 Drawing Figures

US Patent  Sept. 23,1975  3,907,625

25 foil with metal powder, tongs with built-in h.f. winding.

thermo-stabilized heating air or protective gas decreasing flow crossection for increasing flow speed. Radial radiation with high speed at one point or line is bad.

MEANS FOR WELDING PLASTIC PIPE JOINTS TO PLASTIC PIPES

BACKGROUND OF THE INVENTION

This invention relates to method and means for welding joints to pipes. The invention relates particularly to methods and means for welding saddle members, for example, pipe joints composed of a saddle-shaped foot plate integrally formed with an upstanding pipe stub, to the surface of a plastic pipe.

In known welding methods, pipe joints with saddle-shaped foot plates and upstanding pipe stubs, i.e., saddle members, are welded to the surface of a plastic pipe by melting the concave portion of the foot plate and an area on the surface of the plastic pipe which corresponds to the contact surface of the saddle member to be attached. The contact area of the saddle member depends substantially upon the required strength and tightness of the welded joint to be produced. Shrinkage of the materials after welding frequently causes tensile stresses which extend to the edge zone of the saddle surface. These tensile stresses extend partly in the circumferential direction. In extruded pipes, the tensile stresses therefor extend transverse to the extrusion direction, that is transverse to the direction of orientation of the material extruded, and parallel to the initial stress, as a result, highly superposed tension stresses occur at the edge zone of the saddle surface, particularly tangential to the pipe at the foot of the saddle member. As a rule, these tension stresses result in tension cracks which spread to the interior of the pipe wall.

An object of this invention is to eliminate such disadvantages.

Another object of the invention is to furnish welded joints for saddle members which are to a great extent free of such dangerous superposed stresses.

Another object of the invention is to improve welding methods and means for plastic pipe joints.

SUMMARY OF THE INVENTION

According to a feature of the invention, these objects are obtained in whole or in part, by melting the surface of the saddle member which is to contact the pipe and the entire circumference along a given axial length of a pipe to which the member is to be attached, and mounting the saddle member on the melted surface of the pipe so that when the material cools, it fuses and welds the pipe to the member.

This feature eliminates the existing preferential orientation in the pipe wall, at least at the surface. Thus, the initial stresses compensate for each other, particularly in the circumferential direction. This therefore avoids dangerous superposition of these stresses with shrinkage stresses originating from the contact surface due to welding. According to another feature of the invention, a heater extending transverse to the pipe axis has heating elements shaped to the circumference of the pipe so as to embrace the pipe, with inner surfaces which transfer heat to the outer face of the pipe.

According to another feature of the invention, the heating elements include outer surfaces also corresponding to the shape of the circumference of the pipe for simultaneously heating the saddle-shaped foot plate. In this way the saddle member as well as the pipe can be heated simultaneously so as to melt the required surfaces.

According to another feature of the invention, the circumferential surface of the pipe and the concave surface of the saddle member are heated simultaneously by electric heating elements placed between the member and the pipe. The heating elements remain embedded in the melted portion after the welding process has been completed.

According to other features of the invention, the pipe and member are heated by hot air blowers, or inductively.

These and other features of the invention are pointed out in the claims. Other objects and advantages of the invention will become evident from the following detailed description when read in light of the accompanying drawings. While the following description furnishes details of specific embodiments of the invention, it will be obvious to those skilled in the art that the invention may be embodied otherwise without departing from its spirit and scope.

DESCRIPTION OF PREFERRED EMBODIMENTS

Figure 1:
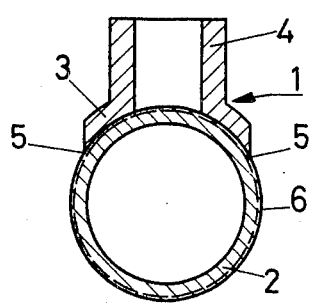
FIG. 1 is a cross section illustrating a welded joint embodying features of the invention.

In FIG. 1, a weldable plastic saddle member 1 is welded to a plastic pipe 2. According to one embodiment of the invention, the pipe 2 is composed of a polyolefin such as polyethylene. A foot plate 3 and a pipe socket 4 integral therewith form the saddle member 1. The saddle member 1 can serve the usual purpose of forming a connection for a branch pipe. In that case the wall of the pipe 2 is drilled through the socket 4. Also, it can be used to connect the pipe 2 to a suspension or support member.

Figure 2:
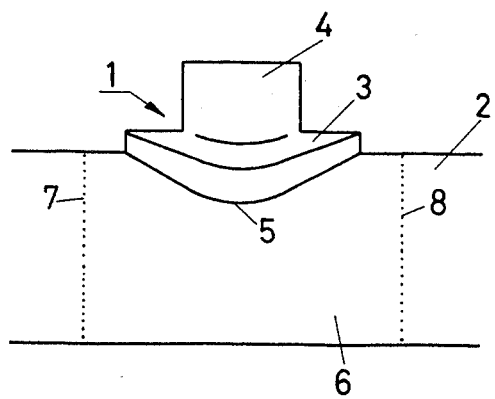
FIG. 2 is a side elevation of the apparatus in FIG. 1.

According to an embodiment of the invention, the saddle member 1 is welded to the pipe 2 by melting the concave contact surface of the foot plate 3 and at the same time melting a cylindrical or ring zone 6 which embraces the entire outer circumferential surface of the pipe 2. The foot plate 3 is then seated on the melted zone and the entire assembly allowed to cool so that the members fuse to each other at the melted portions. In FIG. 1 the depth of the ring or cylindrical zone 6 is indicated by a broken line. The ring zone 6 extends axially slightly beyond the ends of the foot plate 3 as shown in FIG. 2 where the boundaries of the ring zone 6 are indicated by dotted lines 7 and 8. In effect, therefore, the member 1 is seated approximately in the center of the axial dimension of the zone 6.

Because the melted zone 6 extends over the entire circumference of the pipe, only minor superposed stresses appear at those points 5 which hitherto had been particularly susceptible to failure. The extension of the melted portion over the entire circumferential zone prevents tension cracks. In a long time test at 80° C the service life of test pieces of hard polyethylene welded according to this method could be extended by a factor of 10 on the average.

Figure 3:
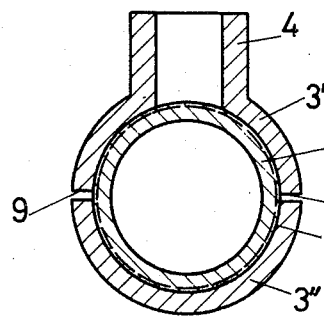
FIG. 3 is a cross sectional view of another welded joint embodying features of the invention.
Figure 4:
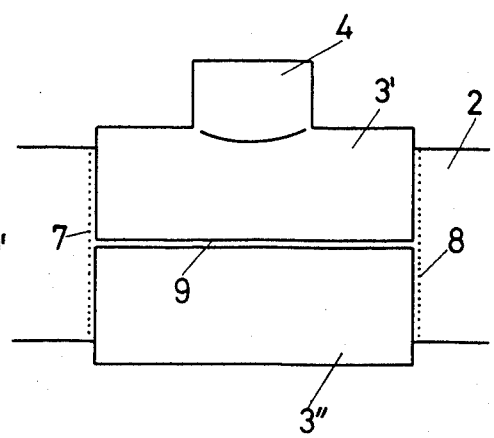
FIG. 4 is a side elevation of the apparatus in FIG. 3.

In the embodiment of FIGS. 3 and 4, two separate saddle members are welded onto the pipe 2 at the same location. In all these Figures like parts are designated with like numerals. The first saddle member in FIGS. 3 and 4 includes a socket 4 integrally formed with a foot plate 3'. The latter, in the form of a half shell extends over about one half of the circumference of the pipe 2. The second saddle member 3'' forms an opposite identical half shell. Both half shells were welded to the pipe 2 by melting the concave surface of the foot plate 3' and saddle member 3'' and a cylindrical or ring zone 6 extending over the entire outer circumferential surface of the pipe 2. As in FIGS. 1 and 2, the foot plate 3' and member 3'' were then seated in position on the zone 6 and cooled until both saddle members welded to the pipe 2. Both half shells mechanically reinforce a section of the pipe 2. This is desirable in some cases, although a foot plate substantially of the dimensions of FIGS. 1 and 2 would be sufficient for permanently and tightly connecting a pipe socket 4 to the pipe 2. In the embodiment of FIGS. 3 and 4 the danger of tension cracks is also eliminated by virtue of the cylindrical or ring zone 6 which was melted all around the pipe.

The half shells are dimensioned so that the clearances at the gaps 9 and 9' are practically eliminated by the contact pressure during the welding and the half shells are fused to each other at their side facing the pipe 2. Full welds at these points are not necessary. The gaps thus form abutment or contact joints. With rough pipe or shells tolerances the edges at the gaps 9 and 9' can, in fact, overlap.

Figure 5:
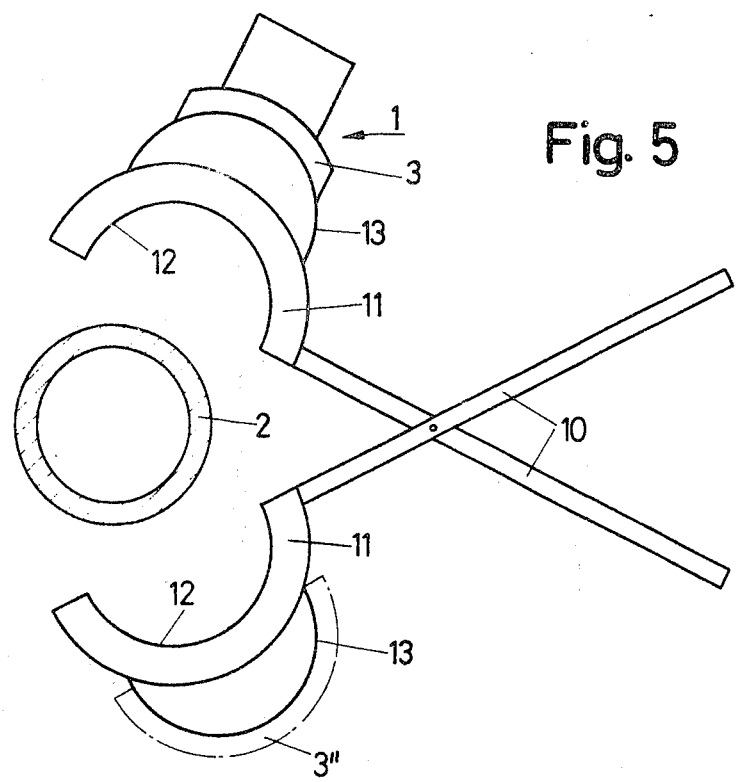
FIG. 5 is an end view of a tong-type welding device embodying features of the invention for producing a weld according to features of the invention, and seen in the axial direction of the pipe.

Various embodiments of the invention may be used for carrying out the welding method. FIG. 5 shows one embodiment, wherein a tong-type device with which the saddle members of FIGS. 1 and 2 or 3 and 4 can be welded on to the pipe 2. An electrically fed heater 11 at the end of each tong arm 10 embraces the pipe 2 from the side, that is, transverse to the pipe axis. A semi-cylindrical inner heat transfer surface 12 on each heater 11 and an identical outer heat transfer surface 13 exhibit radii adapted to the pipe diameter. These heaters on the tongue arms 10 simultaneously melt the cylindrical zone 6 on the surface of the pipe 2 and the concave contact surface of the saddle members. Then the tongue arms are opened and the saddle pieces removed and pressed against the pipe 2.

Figure 6:
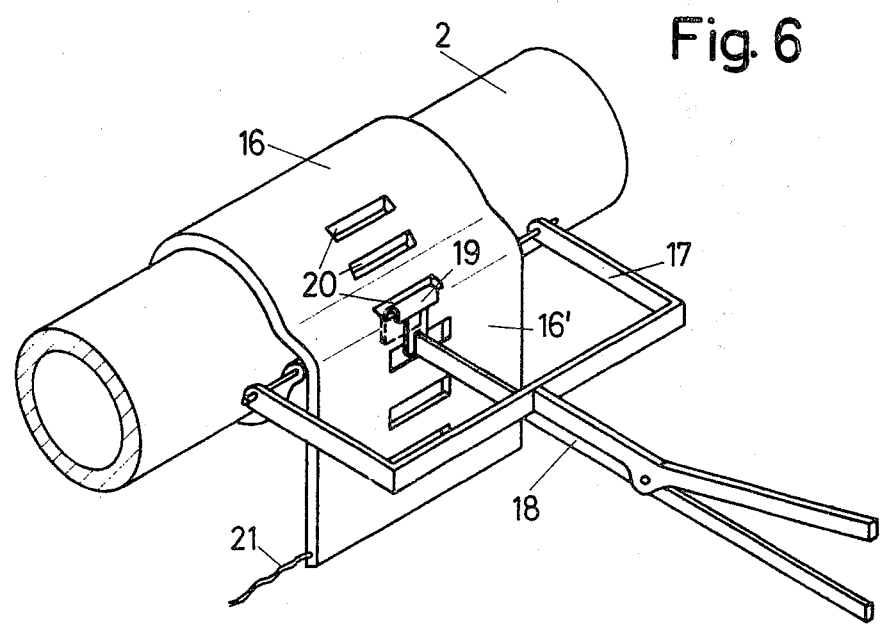
FIG. 6 is a perspective view showing another apparatus embodying features of the invention for producing welds also embodying features of the invention.

In another tong-type welding device shown in FIG. 6, a heater in the form of a flexible heated mat 16 melts the pipe surface. According to one embodiment of the invention the mat 16 is heated electrically. According to other embodiments of the invention, the mat is otherwise heated. The heaters 11 in FIG. 5 may also be heated otherwise. In FIG. 6, one tong arm 17 articulates about its joint so as to hold one end of the mat 16. The other tongue arm 18 engages one of several slots 20 provided in the mat by means of a hook 19 after the mat has been placed around the pipe 2. This way, the welding device can be used with pipes of different diameters. However, the saddle members must have their surfaces melted by other means.

According to one embodiment of the invention, feed lines 21 effect electric heating of the mat 16 directly. According to another embodiment, the mat is electrically heated through the tong arms 17 and 18. Electrical tap contacts of a heating line arranged in the mat are provided in slots 20 which contact the hook 19. In this way, the unused length 16' of the heating mat is not heated. This avoids waste of energy. That is to say, current passes through the arm 18 through the hook 19 and contacts at the slot 20. The heating element in the mat 6 terminates at the arm 17.

Figure 7:
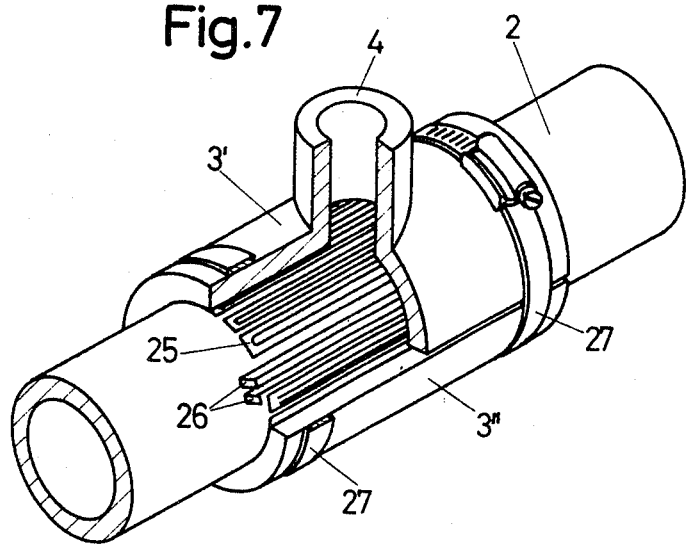
FIG. 7 is a partially cross-sectional perspective view of an apparatus for producing a weld embodying features of the invention and including a flexible heating mat serving as a welding device.

The welding devices shown in FIGS. 5 and 6 can be used repeatedly. FIG. 7 illustrates an embodiment of the invention using a "lost" area heating insert which remains fused in the material after welding. A similar principle has been used for connecting coaxial pipe sections with sleeves. This has been done, for example, in sewer pipes. There, an electric filament winding in the form of a closed collar is inserted axially into the annular slot between the pipe end and the sleeve. The sleeve and the pipe end are thereafter welded. Another way of doing this is to use a prefabricated welding sleeve in which a filament winding is embedded.

Figure 8:
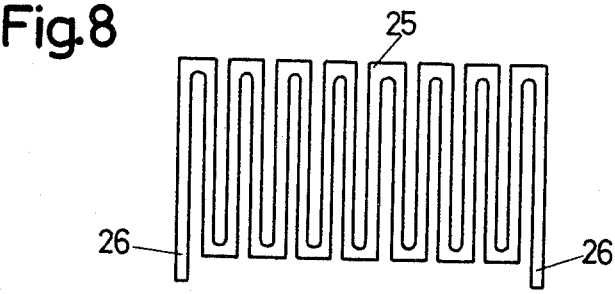
FIG. 8 is a plan view of the heating mat when spread out.

In FIG. 7, a rectangular flexible heating mat 25, composed of a meander-shaped wire or metal strip preferably coated with plastic, as shown in FIG. 8, embraces the pipe 2. The ends 26 of the strip or wire are formed into plug connections. They connect to an electric power source not shown. Tightening straps 27 hold two saddle members 3', 4 and 3'', corresponding to those shown in FIGS. 3 and 4, over the heating mat 25. The heating mat 25 is then heated electrically to a temperature at which both saddle members are welded to the pipe 2. Here again the pipe 2 is melted over a cylindrical zone embracing the entire circumference. The tightening straps 27 can be removed after welding or left in place.

If the member 1, after it is welded to the pipe 2, is to be used for connecting a branch pipe, a hole must be drilled through the pipe 2 in the direction of the socket 4. This hole would pierce the electrical wires of the heating mat, if the mat has the shape shown in FIG. 8. This exposes the metallic wire to the medium flowing through the pipe 2 and a branch pipe. If the medium is non-corrosive, exposure of these wires in the mat to the medium would have no harmful effect. However, corrosive media would tend to corrode the metallic lines to the mat and possibly disturb the water-tight integrity of the pipe system. Moreover, the reaction between the metal and the corrosive medium might affect the purity of the medium.

Figure 9:
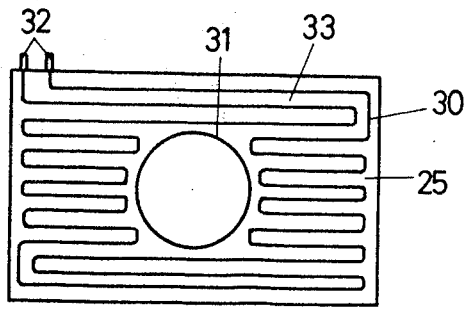
FIG. 9 illustrates another heating mat for use in FIG. 7 and embodying features of the invention.

FIG. 9 illustrates a heating mat suitable for welding members onto the pipe when the pipe is to be used for corrosive fluids. Here a meander-shaped heating line 30 forms a central circular area 31 whose dimensions are equal at least to the bore of the socket 4. Plugs 32 serve as electrical connections for the line 30.

According to one embodiment of the invention, the meander-shaped conductors in the heating mats of FIGS. 8 and 9 are produced by stamping from sheet-metal. According to another embodiment of the invention, the mats are formed as a printed circuit on a plastic foil. According to yet another embodiment of the invention, a plastic foil 33 embeds the stamped metal strip or similarly bent wire as shown in FIG. 9. The plastic foil material must be easily weldable to the pipe and the saddle members.

According to another embodiment of the invention, the heating mat of FIGS. 7, 8 and 9 forms the secondary winding of a transformer whose primary is a source of high frequency energy. In this way high frequency energy is substituted for electrical resistance heating. According to still another embodiment of the invention, plastic foils with embedded metal powder, placed in the position of the mat 25 in FIG. 7 and FIG. 10 are heated by setting up eddy currents in the powder.

According to still another embodiment of the invention, hot air blowers with a plurality of nozzles can be used to provide the heating for the welding operation. According to one example, three such blast nozzles are distributed around the pipe and produce a "cylindrical" hot air current around the pipe which is thus effectively heated by convection. According to yet another embodiment of the invention, radiation heaters embrace the pipe.

In contrast to the above described welding methods and means, known welding systems utilize a pipe-wall heat transfer surface whose area is substantially limited to the contact surface of the saddle member.

Figure 10:
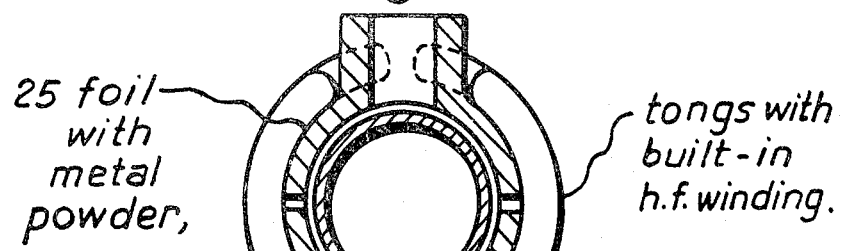

An embodiment of the invention using high frequency energy is shown in FIG. 10. This will illustrate the use of embedded metal powder which is heated by eddy currents.

Figure 11:
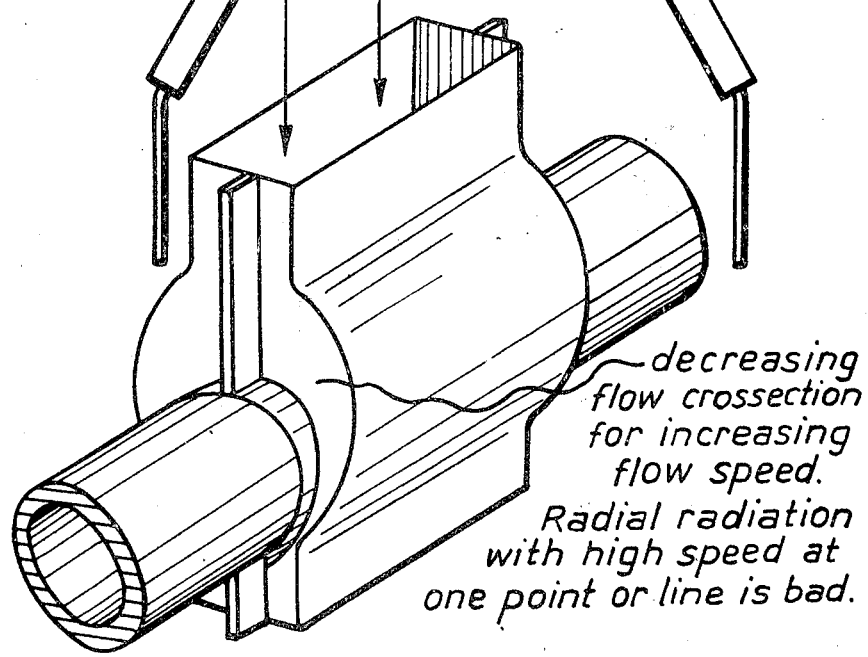

The use of the aforementioned hot air blowers is illustrated in FIG. 11.

What is claimed is:

1. The method of welding a saddle-shaped plastic member onto a pipe of weldable plastic, which comprises:

melting material of a concave surface of the member, melting material of the outer surface of the pipe along an axial length of the pipe while maintaining the structural integrity of the pipe, mounting the concave surface of the member on the pipe at the axial length, and allowing the melted material on the member and the pipe to cool wherein, the step of melting material on the outer surface of the pipe includes melting the material in the circumferential direction of the pipe beyond the circumferential extent of the concave surface of the member when it engages the pipe and completely around the periphery of the pipe and melting the material in the axial direction of the pipe beyond the axial extent of the concave surface of the member in both axial directions when it engages the pipe.

2. The method as in claim 1, wherein the material at the outer surface of the pipe is melted so as to form a cylindrical melted zone.

3. A method as in claim 1, further comprising the step of pressing the member against the pipe after the materials have been melted and before they cool.

4. A method as in claim 3, wherein the material at the outer surface of the pipe is melted so as to form a cylindrical melted zone.

5. A method as in claim 1, wherein the materials of the concave surface of the member and of the outer surface of the pipe are melted simultaneously.

6. A method as in claim 1, wherein melting of the material on the outer surface of the pipe includes embracing the pipe with two semi-conductor heaters.

7. A method as in claim 6, wherein melting of the concave surface of the member includes mounting the member on a convex surface of one of the heaters.

8. A method as in claim 1, wherein the step of melting the material on the surface of the pipe includes wrapping a flexible mat around the pipe and passing a heating current through conductors in the mat.

9. A method as in claim 8, wherein the mat is secured around the pipe by tongs.

10. The method as in claim 1, further comprising the step of placing an electrical heating element around the pipe before the steps of melting and mounting, then performing the step of mounting, and thereafter performing the steps of melting by passing a heating current through the element, and wherein melting the material on the concave surface of the member and the material of the outer surface of the pipe occurs simultaneously by application of heating current through the element.

11. The method as in claim 1, further comprising the step of drilling a hole through the pipe at the location of the member.

* * * * *